July 20, 1965  W. J. GROH  3,195,155
PROCESS OF THREADING AN OPENING
Filed Nov. 26, 1962  2 Sheets-Sheet 1

INVENTOR.
WILLIAM J. GROH
BY
Sheldon F. Raizes
ATTORNEY

July 20, 1965  W. J. GROH  3,195,155
PROCESS OF THREADING AN OPENING
Filed Nov. 26, 1962  2 Sheets-Sheet 2

INVENTOR.
WILLIAM J. GROH
BY
ATTORNEY

United States Patent Office 3,195,155
Patented July 20, 1965

3,195,155
PROCESS OF THREADING AN OPENING
William J. Groh, St. Joseph, Mich., assignor to The Bendix Corporation, St. Joseph, Mich., a corporation of Delaware
Filed Nov. 26, 1962, Ser. No. 239,929
5 Claims. (Cl. 10—1)

This invention relates to a process for tapping or threading an opening.

After an opening is threaded by utilization of a standard tap, the threads of the opening do not define a perfect circular opening, but define an opening having a plurality of flats. The threads of the opening are not leak proof and have consequently produced problems when used as a part of a leak proof fitting.

Accordingly, it is an object of this invention to provide a process for producing threads which define a true circular opening.

Other objects and advantages will be apparent from the following description taken with reference to the accompanying drawings, wherein.

Figure 1:
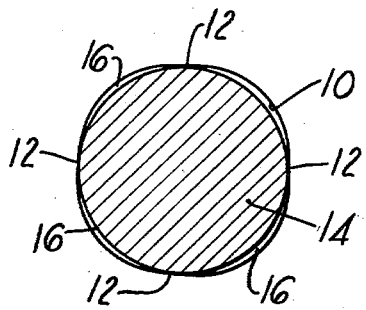
FIGURE 1 is a simplified view illustrating a threaded fitting, the female component being threaded by a standard tap.

Referring to FIGURE 1, there is illustrated an exaggerated view of a threaded opening 10 threaded by a well-known standard tap. When using a standard tap, it is very hard to confine the tap to threading about a single axis due to vibrations and the design of the cutting threads which permit lateral movement of the tap. Thus, instead of the resulting threads defining an opening which is a true circle, an opening forming flats 12 is defined. Obviously, when a threaded male component 14 of a fitting is screwed into the threaded opening 10, fluid leakage is possible through the gap 16 formed between the edge of the threaded opening 10 and the edge of the threaded male component 14.

Figure 2:
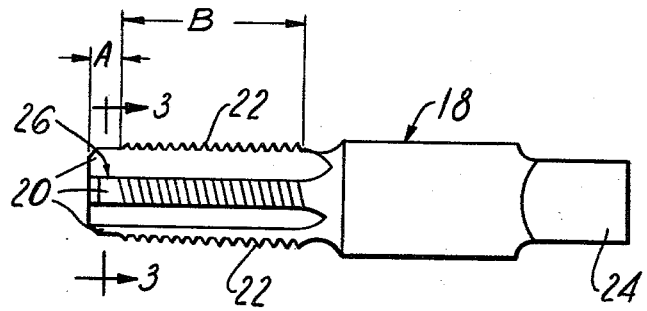
FIGURE 2 is a side elevation view of a combination tap and reamer tool.
Figure 3:
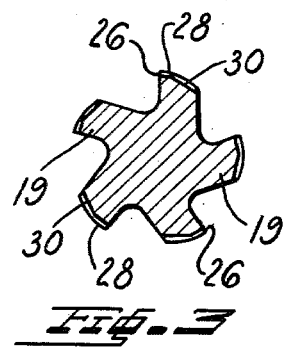
FIGURE 3 is a section view taken on line 3—3 of FIGURE 2.

Referring to FIGURE 2, there is illustrated a reamer guided tap tool 18 with which the invention is concerned. This tool 18 solves the above problem and constructs threads in an opening which are concentric about its axis.

The tool 18 has a plurality of lands 19 with each land having a cutting blade 20 extending axially for a length A and then cutting threads 22 extending axially for a length B. A shank 24 is adapted for insertion into a machine.

Each cutting blade 20 has a cutting edge 26 and a rounded peripheral portion 28 defining an arc of a given radius and which leads from the cutting edge to a flat peripheral portion 30. The rounded portion 28 bears against a wall of an opening while the flat portion 30 provides a clearance between each land 19 and the wall of the opening. The rounded portion 28 prevents cutting during lateral movement of the cutting tool 18 and therefore resists lateral movement of the tool 18 since no metal can be cut or displaced to allow such movement. Thus, when utilizing the tool 18 to tap an opening, the cutting blades 20 act as stabilizers and guides for the cutting threads 22 during tapping.

Figure 4:
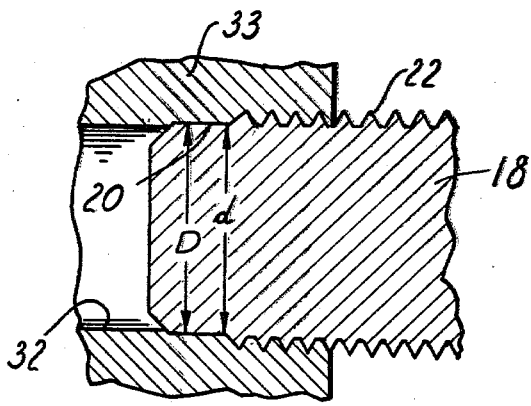
FIGURE 4 is a section view of the tool of FIGURE 2 in operation.
Figure 5:
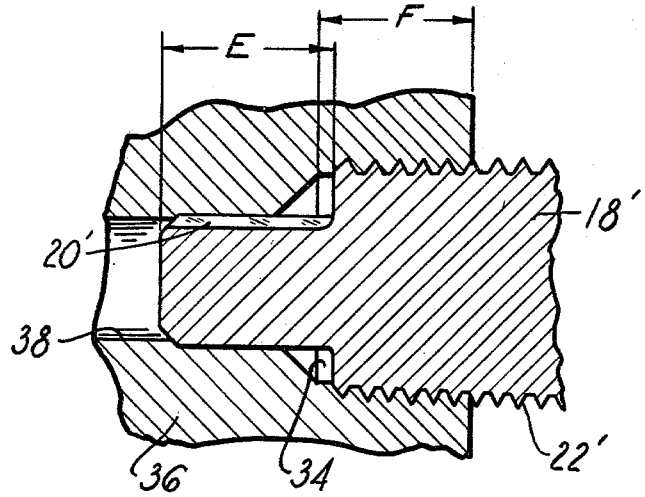
FIGURE 5 is a view of a modified tool of FIGURE 2 in operation.
Figure 6:
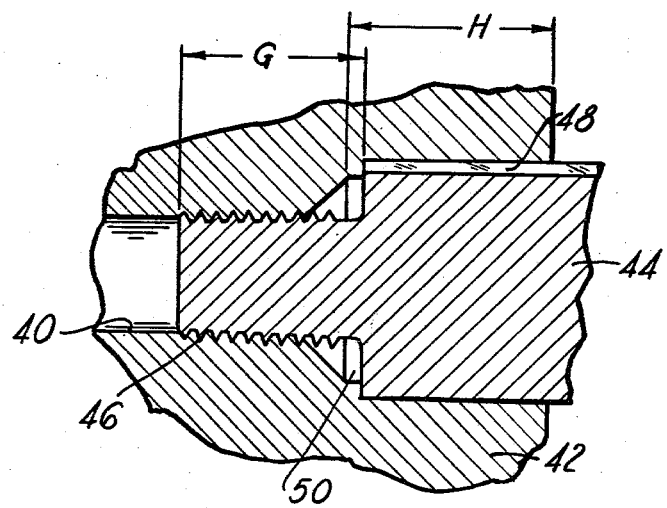
FIGURE 6 is a view of another modified tool in operation.

The tool 18 may be used to ream and tap a drilled opening in one operation utilizing the reamer portion as a reamer and stabilizer or to merely tap a reamed opening with the cutting blades 20 acting as stabilizers for the cutting threads during each operation. FIGURE 4 illustrates the former operation wherein the blades 20 simultaneously ream a drilled opening 32 in body member 33 ahead of the portion being threaded. The major diameter D of the cutting blades must be equal to the minor diameter d of the cutting threads. If the major diameter of the cutting threads increases as illustrated in FIGURE 4 to provide a tapered threaded opening, then the major diameter D of the cutting blades must be equal to the smallest minor diameter d of the cutting threads. FIGURE 5 illustrates the latter operation wherein the counterbore 34 of the multidiametered opening in body member 36 is reamed prior to utilizing tool 18' and then tool 18' is inserted into the body member 36 opening with the cutting blades reaming the drilled bore 38 for the purpose of stabilizing the cutting threads during simultaneous tapping of counterbore 34. In this instance, the distance E between the end of the reamer portion and the beginning of the tap portion must be greater than the length F of the counterbore 34 to ensure reaming of bore 38 simultaneously with tapping of counterbore 34. FIGURE 6 also illustrates the latter operation where the drilled bore 40 of the multidiametered opening in body member 42 is reamed prior to utilizing a tool 44 which has longitudinally arranged thereon cutting threads 46 at one end and then cutting blades 48. The tool is inserted into the opening 42 with the tap portion of the tool 44 cutting threads in the wall of bore 40 while the cutting blades 48 ream the counterbore 50 for the purpose of stabilizing the cutting threads during simultaneous tapping of bore 40. In this instance, the distance G between the end of the tap portion to the beginning of the reamer portion must be less than the length H of the counterbore 50 to ensure reaming of the counterbore simultaneously with tapping of the bore 40.

It is apparent from the foregoing that a simple and inexpensive solution has been produced to provide an opening with threads which define a true circle. It will be understood that various changes and modifications in the structure shown and described may be made in the art without departing from the spirit of the invention.

I claim:

1. A process for tapping an opening in a member comprising: providing a tool having axially arranged reamer and tap portions thereon; providing a member having an opening therein, performing a tapping operation on the wall of said opening, guiding said tap portion by said reamer portion throughout the entire tapping process by performing a reaming operation on the wall of said opening simultaneously with the entire tapping operation.

2. A process for tapping an opening in a member comprising: providing a tool having axially arranged reamer and tap portions thereon; providing a member having an opening therein; initially engaging the reamer portion of said tool with the wall of said opening and performing a reaming operation thereon and thereafter, upon a predetermined advancement of said tool, engaging the tap portion of said tool with the wall of said opening and performing a tapping operation thereon; performing the entire tapping operation simultaneously with reaming of said opening; whereby said tap portion of said tool will be guided by said reamer portion of said tool.

3. A process for tapping an opening in a member comprising: providing a tool having axially arranged thereon, from the advanced end toward the trailing end, a reamer portion and a tap portion; providing a member having an opening therein; initially engaging the reamer portion of said tool with the wall of said opening and performing a reaming operation thereon and thereafter, upon a predetermined advancement of the tool, engaging the tap portion of said tool with the wall of said opening and simultaneously trail the reaming operation with a tapping operation of the reamed portion of the wall throughout the entire tapping operation; whereby the tap portion of the tool will be guided by the reamer portion.

4. A process for tapping an opening in a body member comprising: providing a tool having axially arranged thereon, from the advanced end toward the trailing end, a reamer portion and a tap portion; providing a body member having an opening therein; initially engaging the reamer portion of said tool with the wall of said opening and performing a reaming operation in a forward portion of said opening and thereafter, upon a predetermined forward advancement of said tool, bring said tap portion of said tool into engagement with a rearward portion of said opening and performing a tapping operation; performing the entire tapping operation simultaneously with reaming of the forward portion; whereby said tap portion of said tool is guided by said reamer portion.

5. A process for tapping an opening in a member comprising: providing a tool having axially arranged thereon, from the advanced end toward the trailing end, a tap portion and a reamer portion; providing a body member having an opening therein; initially engaging the reamer portion of said tool with the wall of a rearward portion of said opening and performing a reaming operation thereon and thereafter, upon a predetermined forward advancement of said tool, engaging said tap portion of said tool with a forward portion of said opening and performing a tapping operation thereon; performing the entire tapping operation simultaneously with reaming of the rearward portion; whereby said tap portion of said tool will be guided by said reamer portion.

References Cited by the Examiner
UNITED STATES PATENTS

| | | | |
|---|---|---|---|
| 568,277 | 9/96 | Rall | 10—140 |
| 624,156 | 5/99 | Balcom | 10—140 |
| 678,814 | 7/01 | Riggs | 10—141 |
| 931,526 | 8/09 | Turner et al. | 10—140 |
| 1,190,707 | 7/16 | Beindorf | 10—140 |
| 1,493,079 | 5/24 | Kleiderlein et al. | 10—140 |
| 1,826,323 | 10/31 | Mueller | 10—140 |

OTHER REFERENCES

Tool Engineer's Handbook, 1st Edition, 1949 (pgs. 797–9 only relied on).

ANDREW R. JUHASZ, *Primary Examiner.*